United States Patent [19]

Miyakawa

[11] 4,305,189

[45] Dec. 15, 1981

[54] ATTACHMENT MEMBER FOR MULTIPLE-SPINDLE HEAD

[75] Inventor: Eiji Miyakawa, Tokyo, Japan

[73] Assignee: Miyakawa Industry Company, Limited, Seki, Japan

[21] Appl. No.: 59,936

[22] Filed: Jul. 23, 1979

[30] Foreign Application Priority Data

May 10, 1979 [JP] Japan .................. 54-57441

[51] Int. Cl.³ .............. B23B 9/00; B23B 39/16
[52] U.S. Cl. ............................. 29/50; 408/42;
409/144; 409/230
[58] Field of Search ............. 408/238, 42, 124;
29/568, 26 A, 50; 409/144, 230

[56] References Cited

U.S. PATENT DOCUMENTS

| | | | |
|---|---|---|---|
| 856,306 | 6/1907 | Smith | 409/230 X |
| 968,047 | 8/1910 | Grohmann | 409/230 X |
| 1,999,197 | 4/1935 | Schauer et al. | 408/42 X |
| 2,509,696 | 5/1950 | Pegard | 408/42 X |
| 3,559,495 | 2/1971 | Ludwig | 408/42 X |
| 3,690,220 | 9/1972 | Escobedo | 409/144 X |
| 3,757,637 | 9/1973 | Eich et al. | 409/230 |
| 3,794,436 | 2/1974 | Rowlett | 408/124 |
| 3,797,363 | 3/1974 | Nohevi | 408/42 |
| 4,123,191 | 10/1978 | Braun | 408/42 |

FOREIGN PATENT DOCUMENTS

| | | | |
|---|---|---|---|
| 2612353 | 9/1977 | Fed. Rep. of Germany | 408/42 |
| 309779 | 9/1971 | U.S.S.R. | 408/42 |
| 524613 | 8/1976 | U.S.S.R. | 408/42 |

*Primary Examiner*—William R. Briggs
*Attorney, Agent, or Firm*—Jordan and Hamburg

[57] ABSTRACT

Disclosed is an attachment member for a multiple-spindle head, which is used for attaching the multiple-spindle head to a quill of a drilling machine, a tapping machine or the like. This attachment member is attached to the quill through a cylinder having an attachment flange, and the attachment member includes a driving gear which is arranged so that when the attachment member is attached to the quill, the gear falls in engagement with a spindle in the quill and it is rotated by the spindle. The attachment member is used in the state where it is built in the multiple-spindle head, and in this state, gears for rotating drills, taps or the like attached to the multiple-spindle head are engaged with the driving gear through intermediate gears. At the time of exchange of the multiple-spindle head, the head is dismounted from the cylinder together with the attachment member, and another multiple-spindle head with which another attachment member has been combined in advance is attached to the cylinder instead.

3 Claims, 6 Drawing Figures

ATTACHMENT MEMBER FOR MULTIPLE-SPINDLE HEAD

FIELD OF THE INVENTION

The present invention relates to an attachment member for a multiple-spindle head which is used for attaching the multiple-spindle head to a drilling machine, a tapping machine, a boring machine, a drill unit, a tap unit or the like and dismounting the multiple-spindle head therefrom.

OBJECTS OF THE INVENTION

Figure 1:
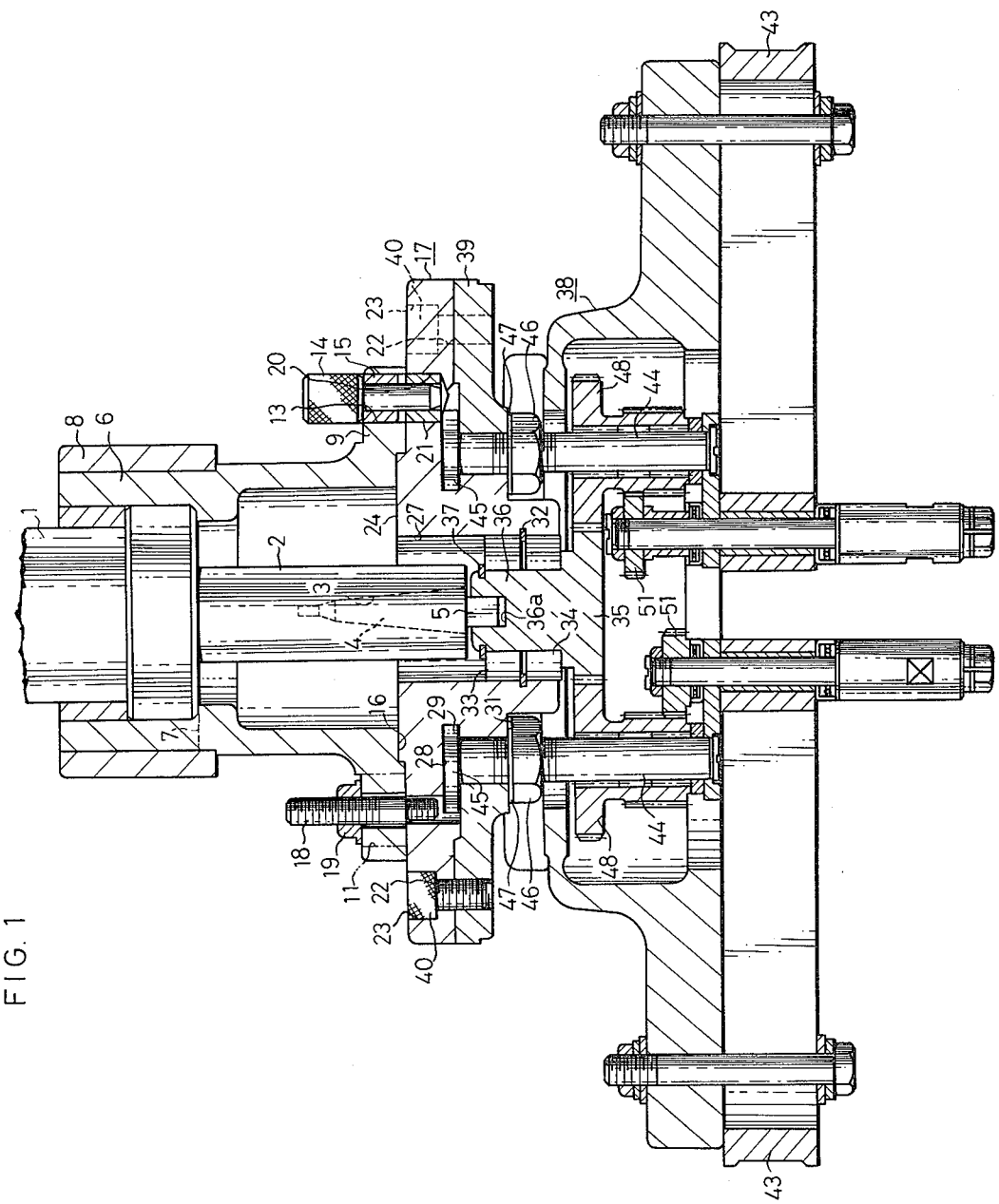
FIG. 1 is a sectional view illustrating the state where the attachment member of the present invention is actually used.
Figure 2:
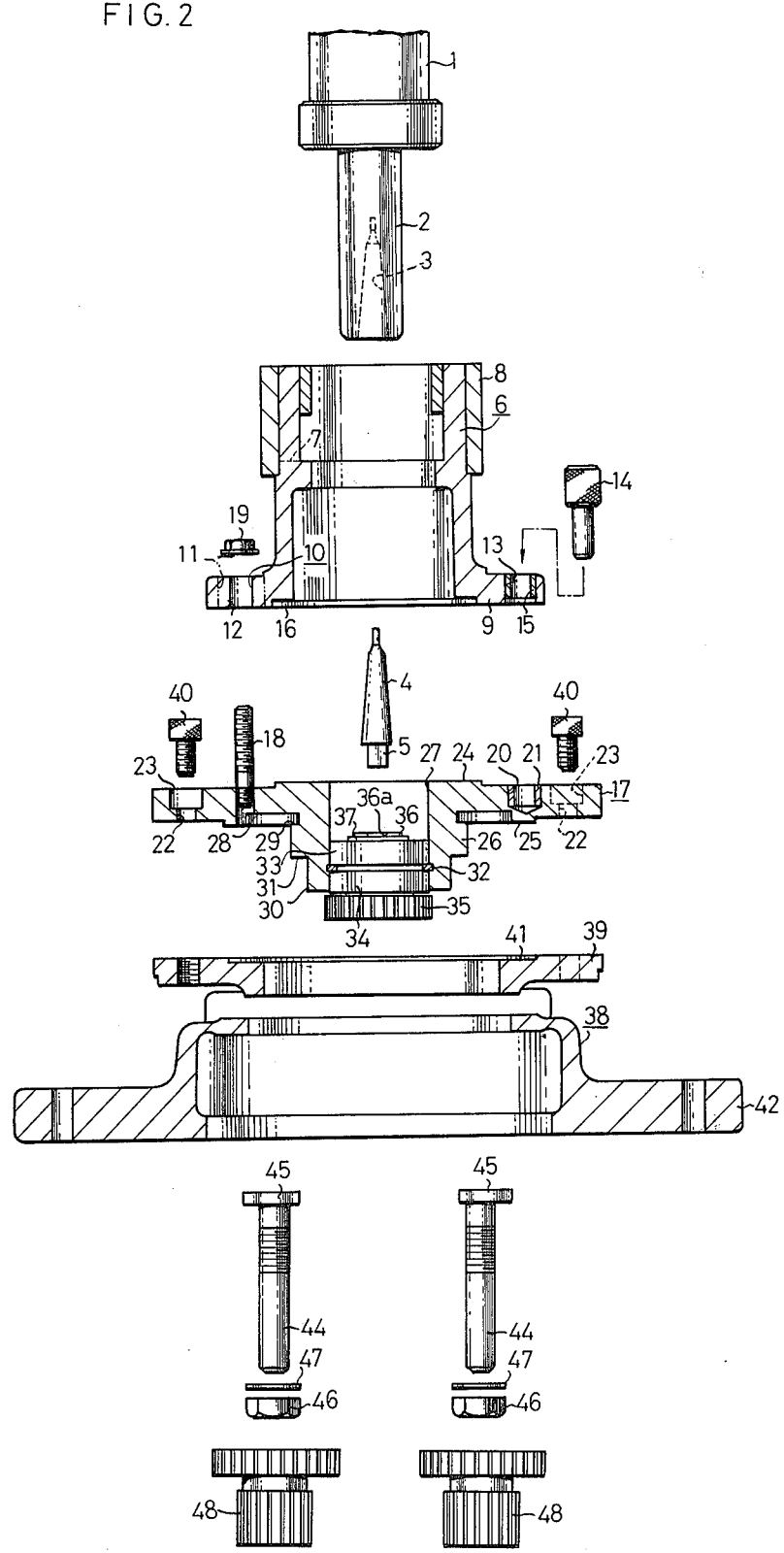
FIG. 2 is an exploded sectional view illustrating the attachment member of the present invention.

It is a primary object of the present invention to provide an attachment member for a multiple-spindle head by which exchange of multiple-spindle heads, that is, the operation of attaching a multiple-spindle head to a quill or dismounting the multiple-spindle head therefrom, can be performed very simply.

Another object of the present invention is to provide an attachment member for a multiple-spindle head, by which at the step of attaching a multiple-spindle head to a quill, the axis of a driving gear is made precisely in agreement with the axis of a spindle in the quill and the axis of the multiple-spindle head by a simple mechanism.

Still another object of the present invention is to provide an attachment member for a multiple-spindle head, by which at the step of exchanging multiple-spindle heads, the position of a multiple-spindle head to be freshly attached to a quill in the peripheral direction thereof can be determined very easily and precisely.

A further object of the present invention is to provide an attachment member for a multiple-spindle head, by which at the step of attaching a multiple-spindle head to a quill, a spindle in the quill can be connected to a driving gear through an arbor very simply.

Other objects of the present invention will be apparent from embodiments illustrated hereinafter and be clarified in the appended claims, and many advantages of the present invention not touched will be understood by those skilled in the art when the present invention is actually practised.

DETAILED DESCRIPTION OF THE PREFERRED EMBODIMENTS

One embodiment will now be described by reference to the accompanying drawing.

Reference numeral 1 represents a quill of a drilling machine or the like, and reference numeral 2 represents a spindle 2 and an attachment hole 3 is formed on the lower end of the spindle 2 for attachment of drills or the like. An arbor 4 is inserted into the attachment hole 3 from below so that rotation of the arbor 4 is not allowed, and an engaging portion 5 having a shape of a square pillar is formed on the lower end of the arbor 4.

A cylinder 6 is attached to the periphery of the quill 1 in the lower end portion thereof. A slit 7 is formed at a part of the upper portion of the cylinder 6 to reduce the diameter of the cylinder 6, particularly shown in FIG. 3. A ring member 8 is capped on the periphery of the upper portion of the cylinder 6, and by clamping both the ends 8a thereof slightly spaced from each other by means of a bolt and nut, the cylinder 6 is entirely attached and fixed to the quill 1.

Figure 3:
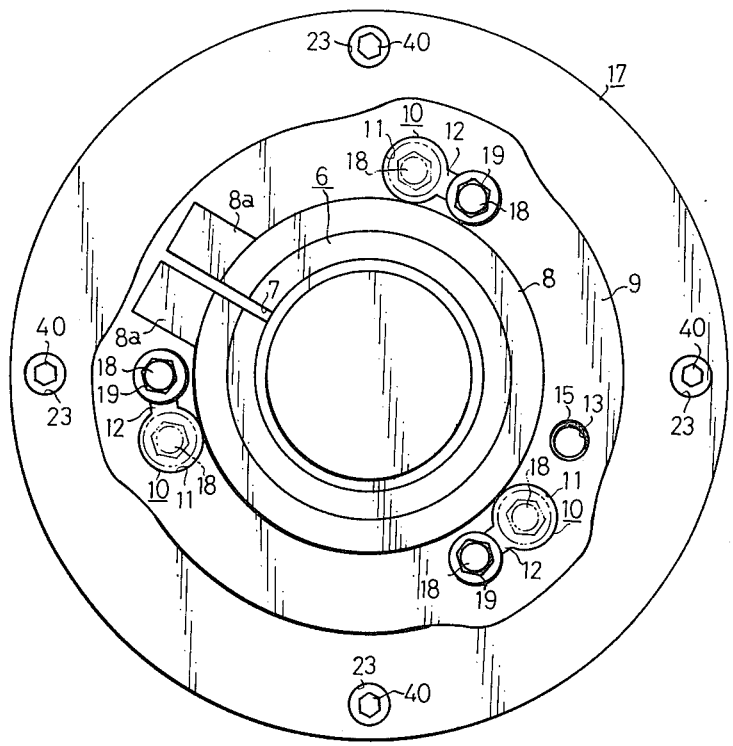
FIG. 3 is a plan view illustrating the state where the attachment member of the present invention is attached to a cylinder.

An attachment flange 9 is integrally formed on the lower end of the cylinder 6, and as shown in FIG. 3, three bolt inserting holes 10 are pierced and arranged equidistantly on the same circumference. Each of the bolt inserting holes 10 comprises a large-diameter portion 11 and a narrow long groove 12 extended from a part of the portion 11 in the circumferential direction of the cylinder 6. A pin inserting hole 13 is pierced through the attachment flange 9 similarly to the bolt inserting hole 10, so that a positioning pin 14 can be inserted into the hole 13. Reference numeral 15 represents a bush in the inserting hole 13 and reference numeral 16 represents a positioning recess formed on the inner peripheral edge of the lower face of the attachment flange 9.

Figure 4:
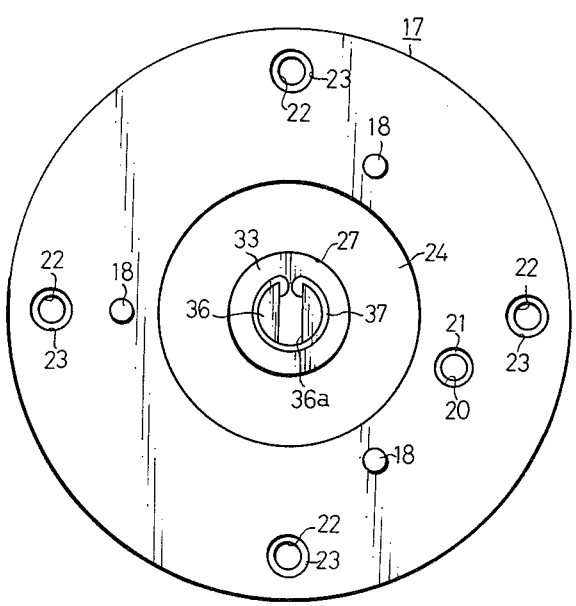
FIG. 4 is a top plan view of the attachment member of the present invention.
Figure 5:
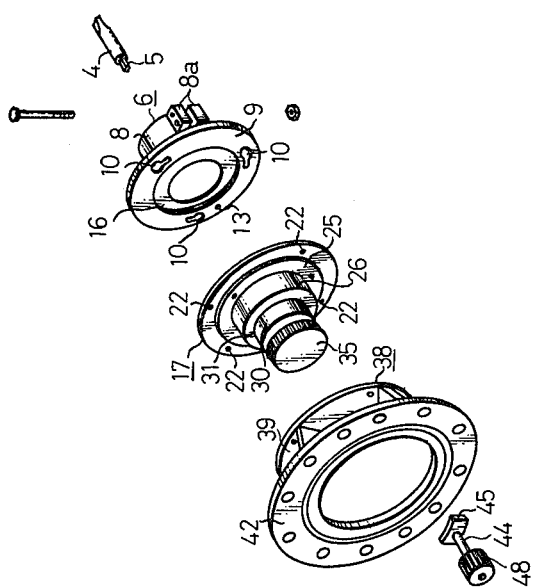
FIG. 5 is an exploded view illustrating the attachment member, multiple-spindle head and cylinder.

An attachment member 17 is attached to the lower face of the attachment flange 9 of the cylinder 6 and it includes a disc-like body 17a. Three bolts 18 (see FIG. 4) corresponding to the bolt inserting holes 10 of the attachment flange 9 are planted on the top face of the attachment member 17. Each bolt 18 is projected upwardly from the long groove 12 of the inserting hole 10 and the attachment member 17 is fixed to the cylinder 6 by a washer-provided nut 19 engaged with the projected portion of the bolt 18. The diameter of the washer is larger than the width of the long groove 12 of the bolt inserting hole 10 but is smaller than the large-diameter portion 11.

A pin inserting hole 20 similar to the pin inserting hole 13 of the cylinder 6 and corresponding thereto is pierced through the body 17a of the attachment member 17. Reference numeral 21 represents a bush of the pin inserting hole 20.

Four bolt inserting holes 22 are equidistantly formed on the body 17a outside the bolt 18 and pin inserting hole 20. Reference numeral 23 represents a spot facing hole of the bolt inserting hole 22.

A positioning projection 24 is formed on the top face of the central portion of the body 17a of the attachment member 17 so that it is fitted in the positioning recess 16 formed on the lower face of the attachment flange 9, and another positioning projection 25 is formed on the lower face of the central portion of the body 17a. A cylindrical portion 26 is projected from the lower face of the central portion of the positioning projection 25 and a container portion 27 opened to the top face of the body 17a is formed in the interior of the cylindrical portion 26.

An annular engaging recess 28 is formed on the lower face of the body 17a while excavating the periphery of the top end of the cylindrical portion 26, and a step portion 29 is formed on the lower face of the inner circumference of the engaging recess 28. A recess 30 is formed on the periphery of the lower part of the cylindrical portion 26 and a step portion 31 is formed on the top face of the recess 30.

A stop ring 32 is attached to the lower part of the container portion 27, and a pair of bearings 33 and 34 are mounted in the container portion 27 so that they grip the stop ring 32 from above and below. A driving gear 35 is disposed below the lower bearing 34, and a shaft 36 of the driving gear 35 is passed through the two bearings 33 and 34 and is slightly projected upwardly. The driving gear 35 is exposed downwardly from the container portion 27. A stop ring 37 is attached to the upwardly projected portion of the shaft 36 so as to prevent the driving gear 35 from falling down through the bearings 33 and 34. Incidentally, the upper and lower bearings 33 and 34 are prevented from falling down by the stop ring 32 and driving gear 35, respectively.

An engaging groove 36a is formed on the top face of the shaft 36 so that when the attachment member 17 is built in the attachment flange 9 of the cylinder 6, the engaging groove 36a becomes engaged with the engaging portion 5 on the lower end of the arbor 4.

A multiple-spindle head 38 is attached to the lower face of the body 17a of the attachment member 17, and the bolts 40 inserted into the bolt inserting holes 22 of the body 17a are screwed into an upper flange 39 which has an annular configuration. The multiple spindle head 38 is fixed to the attachment member 17 by the bolts 40.

A positioning recess 41 is formed on the inner circumferential edge of the top face of the upper flange 39 of the multiple-spindle head 38, and the positioning projection 25 on the lower face of the body 17a of the attachment member 17.

As shown in FIG. 1, a lower flange 42 of the multiple-spindle head 38 is disposed to attach thereto and support thereon drills or the like through a spindle holder 43 or a fixing plate.

Anchoring plates 45 are fixed to the top ends of a plurality of T-shaped bolts 44 and these anchoring plates 45 are fitted in the engaging recess 28 of the attachment member 17. These bolts 44 are extended downwardly through between the cylindrical portion 26 of the attachment member 17 and the inner circumferential edge of the upper flange 39 of the multiple-spindle head 38. The anchoring plate 45 of each T-shaped bolt 44 has the inside thereof engaged with the step portion 29 of the engaging recess 28 and the outside thereof engaged with the top face of the positioning recess 41 of the multiple-spindle head 38.

A nut 46 is screwed into each T-shaped bolt 44 from below, and the nut 46 has a butting contact with the lower step portion 31 of the cylindrical portion 26 of the attachment member 17 and the lower face of the inner circumference of the upper flange portion 39 of the multiple-spindle head 38 through a washer 47. The respective T-shaped bolts 44 are fixed by the nuts 46 so that they cannot be moved. An intermediate gear 48 is rotatably attached to the lower part of each T-shaped bolt 44, so that the intermediate gear 48 is engaged with the driving gear 35 of the attachment member 17. The rotation of each intermediate gear 48 is transmitted to the drills or the like through a driven gear 51.

In the foregoing embodiment, the rotation of the spindle 2 is transmitted from the arbor 4 through the shaft 36 to the driven gear 35 and to the intermediate gear 48 engaged therewith, and the rotation of the intermediate gear 48 is transmitted to the drills, the taps or the like.

In the foregoing embodiment, in the case where in order to change the number of drills attached to the multiple-spindle head 38 or the pitches among the drills, the multiple-spindle head 38 is exchanged with another head, the multiple-spindle head 38 is taken out together with the attachment member 17 from the cylinder 6 while the cylinder 6 is kept attached to the quill 1.

When the multiple-spindle head 38 is taken out, the positioning pin 14 is upwardly drawn out from the attachment flange 9 of the cylinder 6, and then, the nuts 19 screwed to the three bolts 18 on the attachment member 17 are loosened and the attachment member 17 is turned to the left in FIG. 3. Each bolt 18 is moved to the large-diameter portion 11 in the bolt inserting hole 10 (see the position indicated by a two-dot chain line in FIG. 3) and the nut 19 is kept in such state that the nut 19 can be drawn out downwardly from the large-diameter portion 11 while being engaged with the bolt 18.

Accordingly, if the multiple-spindle head 38 is drawn out downwardly together with the attachment member 17 in this state, the head 38 and attachment member 17 can be taken out from the cylinder 6 very simply.

When the multiple-spindle head 38 is thus taken out, the engaging portion 5 of the arbor 4 attached to the lower end of the spindle 2 is separated from the engaging groove 36a of the shaft 36 of the driving gear 35 and the arbor 4 is kept attached to the spindle 2. The intermediate gear 48 is taken out together with the multiple-spindle head 38 while it is engaged with the driving gear 35.

When another multiple-spindle head 38 is attached instead of the thus dismounted multiple-spindle head 38, according to procedures reverse to the above-mentioned procedures, the attachment member 17 is built in the multiple-spindle head 38 and while the intermediate gear 48 is engaged with the driving gear 35, the multiple-spindle head 38 is lifted up and the three bolts 18 on the attachment member 17 are inserted into the bolt inserting holes 10 from below while the nuts 19 are screwed to the bolts 18. In this case, the bolt 18 is first inserted into the large-diameter portion 11 and the positioning projection 24 at the center of the attachment member 17 is fitted in the positioning recess 16 on the lower face of the cylinder 6. Then, the multiple-spindle head 38 is turned to the right in FIG. 3 together with the attachment member 17, and each bolt 18 is moved into the long groove 12, and the pin inserting hole 20 of the attachment member 17 is made in agreement with the pin inserting hole 13 of the cylinder 6 and the positioning pin 14 is inserted into both the pin inserting holes 13 and 20 from above. In this state, the nut 19 on each bolt 18 is tightly clamped.

When the multiple-spindle head 38 is thus attached, the engaging portion 5 of the arbor 4 is fitted in and engaged with the engaging groove 36a of the shaft 36 of the driving gear 35 and the arbor 4 is connected to the driving gear 35 so that they can be integrally rotated. If the arbor 4 is not appropriately engaged with the shaft 36, by turning drills mounted on the multiple-spindle head 38 by hands, the driving gear 35 and shaft 36 are turned through the intermediate gear 48 to cause the engaging portion 5 of the arbor 4 to fall in engagement with the engaging groove 36a of the shaft 36.

The operation of exchanging multiple-spindle heads 38 is completed in the foregoing manner. At the time of exchange, the position of the multiple-spindle head 38 with respect to the radial direction is regulated by the positioning projection 24 of the attachment member 17 and the positioning recess 16 of the cylinder 6. Accordingly, the axis of the driving gear 35 is always in agreement with the axis of the spindle 2 precisely. Furthermore, the position of the multiple-spindle head 38 with respect to the circumferential direction is precisely regulated by the positioning pin 14. Accordingly, for example, if a tap is set on a drill hole, the center of the head 38 is not deviated from the axis of the tap, and hence, the operation can be performed very conveniently.

Still further, since the intermediate gear 48 is kept engaged with the driving gear 35 at the time of exchange, it is not necessary to perform the operation of engaging the gear 48 with the gear 35 every time the exchange is completed.

Figure 6:
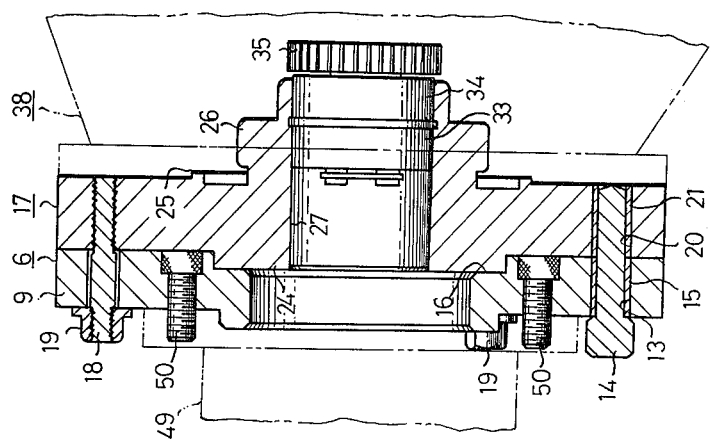
FIG. 6 is a sectional view illustrating another embodiment of application mode of the attachment member of the present invention.

The attachment member 17 of the present invention can be used in a lateral posture as shown in FIG. 6. In the embodiment shown in FIG. 6, the cylindrical portion of the cylinder 6 is omitted and a plurality of bolts 50 are mounted on the attachment flange 9 so as to fix the attachment member 17 to the body portion 49 of the drill unit or the like.

The present invention has been described in detail to some extent by reference to the most preferred embodiments thereof. As will be apparent to those skilled in the art, various changes and modifications may be made to these embodiments without departing from the spirit and scope of the present invention, and the present invention is not limited to specific embodiments except those specified in the claims.

What I claim is:

1. A combination of a multiple spindle head and means for attaching the spindle head to a quill having a rotational shaft inside the quill, comprising:
    (A) a base member including
        (i) a cylindrical portion having a vertical slit,
        (ii) a base flange at a lower end of said cylindrical portion and having a plurality of elongated first bolt holes, at least one positioning hole, and a first positioning recess located at an inner edge thereof, each first bolt hole having a large diameter portion at one end thereof and extending circumferentially in the base flange, and
        (iii) a ring member having fastening means for tightening, said cylindrical portion being located outside the quill so that when said fastening means of the ring member is operated, said cylindrical portion is tightened to thereby firmly connect the base member to the quill,
    (B) an attachment member connected to said base member including
        (i) a cylindrical attachment body having first and second positioning projections extending upwardly and downwardly therefrom respectively, said first positioning projection being engaged with said first positioning recess in said base flange to vertically align said base member and attachment member when they are connected together,
        (ii) an attachment flange outside said body and including a lower face, a plurality of bolts with nuts extending upwardly from the attachment flange for insertion together with the nuts through the large diameter portions of the first bolt holes in the base flange, an annular engaging recess on the lower face of the attachment flange and having a plurality of step portions extending therefrom into said attachment body, a plurality of second bolt holes, and at least one positioning depression,
        (iii) driving means located in the center of said attachment body and having at least one bearing and a driving gear supported by said bearing for rotation, and
        (iv) at least one positioning pin inserted through the positioning hole of said base member into the positioning depression of said attachment flange for angularly positioning said base member and said attachment member when the base member and the attachment member are tightened together by the nuts after said bolts with nuts are inserted through the large diameter portions of the bolt holes and the attachment member is turned,
    (C) a spindle head connected to said attachment member including
        (i) an upper spindle flange having a second positioning recess located inside the flange and a plurality of threaded holes, said second positioning recess being engaged with said second positioning projection of said attachment body to vertically align said attachment member and said spindle head when they are connected together,
        (ii) a lower spindle flange having a plurality of bores for attaching a spindle holder thereto,
        (iii) a plurality of connecting bolts inserted through said second bolt holes of said attachment flange into said threaded holes of said upper spindle flange for connecting said spindle head and said attachment member, and
        (iv) a plurality of spindle assemblies each including an axle having an anchoring plate at one end and an intermediate gear rotationally situated on the axle, said anchoring plate being located in said annular engaging recess of said attachment flange and firmly engaged with said step portion when said spindle head is connected to said attachment member, and
    (D) an arbor situated between the driving gear and the rotational shaft, said arbor being easily engagable and disengagable with the driving gear and the rotational shaft,
    whereby said attachment member to which said spindle head is connected can be attached to and detached from said base member for easily changing said spindle head.

2. A combination according to claim 1, in which said driving means with said driving gear of said attachment member comprises a stop ring immovably located in the attachment body, two bearings situated above and below said ring respectively, and a support ring, said driving gear having a driving shaft extending upwardly through said two bearings and engaging with said support ring to thereby support said driving gear.

3. A combination according to claim 2, in which said arbor includes a tapered front projection and a rear engaging projection, said rotational shaft having a concavity to engage with said front projection of said arbor, and said driving shaft of said driving gear having an engaging groove to engage with said rear projection of said arbor, whereby when said attachment member with said spindle head is connected to said base member, said arbor is disposed between said rotational shaft and said driving shaft for transferring rotational power of said rotational shaft to said intermediate gears through said driving gear.

\* \* \* \* \*